Nov. 12, 1957   F. R. GEIGER   2,812,532
CASTOR
Filed July 20, 1955

INVENTOR.
FRED R. GEIGER

United States Patent Office 2,812,532
Patented Nov. 12, 1957

2,812,532
CASTOR

Fred R. Geiger, Clinton, Mich.

Application July 20, 1955, Serial No. 523,204

1 Claim. (Cl. 16—18)

My invention relates to a new and useful improvement in a castor attachment for mounting on the bottom of various articles to provide a traction wheel whereby the article may be drawn over a supporting surface.

It is the object of the present invention to provide a castor of this type which will be simple in structure, economical of manufacture, durable, compact and highly efficient in use.

Another object of the invention is the provision of a castor having a plastic washer of long wear resistance. This washer being rotatable and serving to bear the load transmitted to the castor.

Another object of the invention is the provision of a castor provided with an attachment plate having a circular flange pressed downwardly from the bottom thereof to provide a recess in which a thrust resisting washer may engage.

Other objects will appear hereinafter.

It is recognized that various modifications and changes may be made in the details of the structure illustrated without departing from the invention, and, it is intended that the present disclosure shall be considered to be but the preferred embodiment.

Forming a part of this application are drawings, in which.

Figure 1:
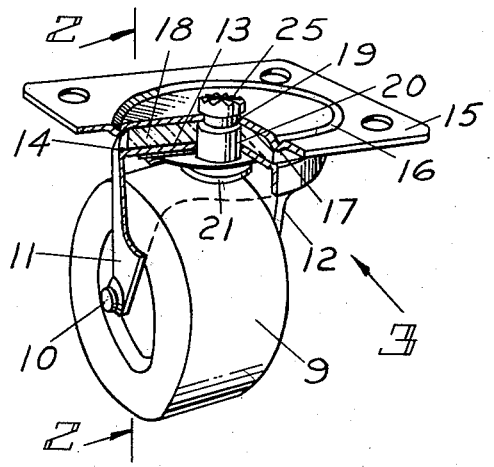
Fig. 1 is a perspective view of the invention with parts broken away and parts shown in section.
Figure 3:
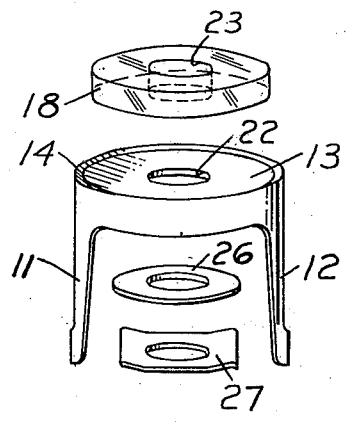
Fig. 3 is an elevational view of the parts forming the invention with the exception of an attaching plate.
Figure 2:
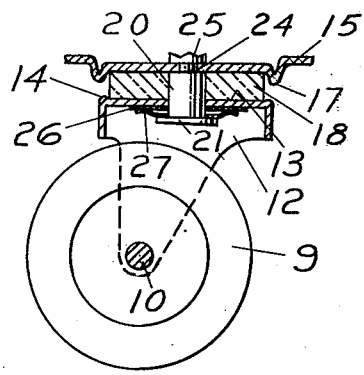
Fig. 2 is a sectional view taken on line 2—2 of Fig. 1.

As shown in the drawings, the invention comprises a castor wheel 9 rotatable on the axle wheel 10 which projects through the yoke arms 11 and 12 which project downwardly from the plate 13. This plate 13 is circular and at its marginal or peripheral edges there is projected an outwardly projecting flange or rib 14.

An attachment plate 15 is provided with openings formed therethrough through which bolts or screws may be projected to secure the plate 15 to the body which is to be supported by the castor construction. A groove 16 is formed in the upper face of the plate 15 by pressing downwardly from the upper face of the plate 15 the bead or rib 17 which defines a recess in which may engage a circular washer 18. This washer 18 is formed from fiber, or preferably plastic, of great wear resistance.

A pivot pin 20 is provided with a head 21 and is adapted to project through the opening 22 formed in the plate 13 and through the opening 23 in the washer 18. A reduced portion 19 of this pivot pin projects through an opening in the plate 15 and is provided with the upset head 25 so that the plate 15 is securely clamped against the shoulder 30 of the pivot pin 20.

A washer 26 is provided through which the pivot pin 20 projects and this washer 26 engages the bottom face of the plate 13. Engaging the bottom face of the washer 26 is a spring clip 27 through which the pivot pin 20 projects.

When constructed in this manner the parts are all securely held in position with a certain flexibility of movement between the bottom of the washer 18 and the plate 13, but this movement is not as great as the height of the flange 14 so that the washer thus remains centered.

Since this washer is formed from plastic or fiber of a high degree of wear resistance, a durable structure is provided.

Experience has also shown that by using this type of thrust receiving member, such as the member 18, a free and easy swiveling of the castor becomes possible.

What I claim is:

A castor comprising: a yoke including a pair of vertical spaced apart arms; a traction member; an axle mounted between the lower ends of said arms and rotatably carrying said traction member thereon; said yoke further including an integral horizontally disposed circular plate connecting the upper ends of said arms; the lower ends of said arms terminating laterally inwardly of the periphery of said circular plate; a circular rib projecting upwardly from the periphery of said circular plate; an attachment plate for connection of an article on which the castor is to be mounted; a circular flange projecting downwardly from the lower face of said attachment plate in alignment with said rib to define a cavity therebetween; a circular non-metallic washer positioned in said cavity and engaging said rib and flange; a pivot pin extended through said circular plate and said washer and said attachment plate for rotatably securing said washer between said plates; said pivot pin having a reduced portion for projection through said attachment plate and an upper head on the upper end of said reduced portion engaging the upper face of said attachment plate for clamping the same against the terminal portion of said reduced portion; said pivot pin having a lower head on the lower end thereof; a metal washer mounted on said pivot pin beneath said circular plate; a spring clip mounted on said pivot pin between said metal washer and said lower head for normally retaining said first mentioned washer and circular plate in engagement with each other; and, the length of said pivot pin being greater between said reduced portion and said lower head than the combined thickness of said non-metallic washer, circular plate, metal washer and spring clip to provide for freedom of movement between said washer and circular plate.

References Cited in the file of this patent

UNITED STATES PATENTS

| 623,157 | Hunter | Apr. 18, 1899 |
| 1,275,882 | Ellison | Aug. 13, 1918 |
| 1,609,880 | Peters | Dec. 7, 1926 |
| 2,487,803 | Heimann | Nov. 15, 1949 |

FOREIGN PATENTS

| 2,009 | Great Britain | Sept. 16, 1854 |
| 219,250 | Great Britain | July 24, 1924 |